US012277255B2

(12) United States Patent
Moser et al.

(10) Patent No.: US 12,277,255 B2
(45) Date of Patent: Apr. 15, 2025

(54) SECURE SEMICONDUCTOR AND SYSTEM DESIGN

(71) Applicant: BAE SYSTEMS Information and Electronic Systems Integration Inc., Nashua, NH (US)

(72) Inventors: David D. Moser, Haymarket, VA (US); Daniel L. Stanley, Warrenton, VA (US); Joshua C. Schabel, Apex, NC (US); Tate J. Keegan, Merrimack, NH (US); Sheldon L. Grass, Chester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/907,020

(22) PCT Filed: Mar. 24, 2022

(86) PCT No.: PCT/US2022/021750
§ 371 (c)(1),
(2) Date: Sep. 22, 2022

(87) PCT Pub. No.: WO2023/182993
PCT Pub. Date: Sep. 28, 2023

(65) Prior Publication Data
US 2024/0202375 A1 Jun. 20, 2024

(51) Int. Cl.
*G06F 21/76* (2013.01)
*G06F 30/347* (2020.01)

(52) U.S. Cl.
CPC .......... *G06F 21/76* (2013.01); *G06F 30/347* (2020.01)

(58) Field of Classification Search
CPC ...... G01R 31/31719; G01R 31/318533; G01R 31/318588; G06F 15/7825; G06F 15/7807;
(Continued)

(56) References Cited

U.S. PATENT DOCUMENTS 5,898,776 A * 4/1999 Apland ............ G01R 31/31719
326/8
7,398,441 B1 * 7/2008 Gee ................ G01R 31/318533
714/736

(Continued)

OTHER PUBLICATIONS

A. Khan, M. k. Sharma, G. Ganesh, S. D. Dhodapkar, B. B. Biswas and R. K. Patil, "A cryptographic primitive based authentication scheme for run-time software of embedded systems," (ICRESH), Mumbai, India, 2010, pp. 500-504. (Year: 2010).*

(Continued)

*Primary Examiner* — Michael Simitoski
(74) *Attorney, Agent, or Firm* — Gary McFaline

(57) ABSTRACT

A secure system includes a data port, a network on chip (NoC) module, a processor communicatively coupled to the NoC module, a communication interface operatively coupled to the processor and to the data port, an electronic field-programmable gate array (eFPGA) configuration module operatively coupled to the NoC module, and a clock operatively coupled to the NoC module. In a first modality, the communication interface is at least partially disabled. In a second modality, the communication interface is at least partially disabled, boundary scan operations are disabled, a RESET signal is held in a constant state, and/or redacted code is rendered inoperable. In a third modality, the communication interface is at least partially enabled to send and receive commands and data via the data port, the boundary scan operations are enabled, the RESET signal is not held in the constant state, and/or the redacted code is operable.

17 Claims, 6 Drawing Sheets

(58) Field of Classification Search
CPC .......... G06F 21/44; G06F 21/74; G06F 21/76; G06F 21/85; G06F 11/3656; G06F 11/267; G06F 11/2733; G06F 30/34; G06F 30/347; G06F 13/20
See application file for complete search history.

(56) References Cited

U.S. PATENT DOCUMENTS

| | | | | |
|---|---|---|---|---|
| 9,946,826 | B1* | 4/2018 | Atsatt | G06F 30/327 |
| 10,608,640 | B1* | 3/2020 | Orthner | G06F 13/4282 |
| 11,280,829 | B1* | 3/2022 | Poolla | G01R 31/3177 |
| 11,442,844 | B1* | 9/2022 | Peattie | G06F 11/27 |
| 12,047,504 | B2* | 7/2024 | Ishikawa | H04L 9/32 |
| 2005/0203988 | A1* | 9/2005 | Nollet | G06F 15/7825 |
| | | | | 709/201 |
| 2005/0242924 | A1* | 11/2005 | Yosim | G06F 21/71 |
| | | | | 340/5.74 |
| 2007/0033454 | A1* | 2/2007 | Moss | G06F 21/74 |
| | | | | 714/724 |
| 2014/0344960 | A1* | 11/2014 | Adams | G06F 21/86 |
| | | | | 726/34 |
| 2015/0288531 | A1* | 10/2015 | Kumar | H04L 49/604 |
| | | | | 370/401 |
| 2016/0018465 | A1* | 1/2016 | Bockelkamp | G06F 11/3652 |
| | | | | 714/726 |
| 2017/0176530 | A1* | 6/2017 | Cottrell | G01R 31/31719 |
| 2019/0129870 | A1* | 5/2019 | Atsatt | G06F 13/4027 |
| 2019/0258796 | A1* | 8/2019 | Paczkowski | G06F 9/54 |
| 2019/0303268 | A1* | 10/2019 | Ansari | G06F 11/2733 |
| 2019/0347401 | A1* | 11/2019 | Chen | G01R 31/31719 |
| 2020/0380121 | A1* | 12/2020 | Pasricha | G06F 21/554 |
| 2021/0124711 | A1* | 4/2021 | Ansari | G06F 11/0772 |
| 2021/0148977 | A1* | 5/2021 | Bhunia | G01R 31/318328 |
| 2021/0149837 | A1* | 5/2021 | Mishra | G06F 15/7807 |
| 2021/0313988 | A1* | 10/2021 | Weber | H01L 25/0657 |
| 2023/0090760 | A1* | 3/2023 | Liew | G01R 31/31855 |
| | | | | 713/167 |
| 2023/0133385 | A1* | 5/2023 | Goyal | G06F 21/85 |
| | | | | 726/26 |
| 2023/0169251 | A1* | 6/2023 | Riepe | G06F 30/392 |
| | | | | 716/100 |

OTHER PUBLICATIONS

S. Ray, E. Peeters, M. M. Tehranipoor and S. Bhunia, "System-on-Chip Platform Security Assurance: Architecture and Validation," in Proceedings of the IEEE, vol. 106, No. 1, pp. 21-37, Jan. 2018, doi: 10.1109/JPROC.2017.2714641. (Year: 2018).*

International Search Report and Written Opinion received for PCT/US/2022/021750, mailed Jul. 18, 2022. 8 pages.

* cited by examiner

SECURE SEMICONDUCTOR AND SYSTEM DESIGN

FIELD OF DISCLOSURE

The present disclosure relates to semiconductors and semiconductor systems, and more particularly, to a secure semiconductor and system design.

BACKGROUND

Design for test (DFT), also referred to as design for testability, involves design techniques for integrated circuits and semiconductor components that provide testability features to the device. The added features make it easier to develop and apply manufacturing tests to the hardware. The manufacturing tests, which are specifically accommodated by the design of the device, are used to validate that the hardware has no manufacturing defects that could adversely affect the product's correct functioning. The tests can also be used, for example, by the customer for further validation, diagnostics, and maintenance.

JTAG (named after the Joint Test Action Group which codified it) is an industry standard for verifying designs and testing printed circuit boards after manufacture. JTAG specifies the use of a dedicated serial communications testing interface onboard the semiconductor device. The interface connects to an on-chip Test Access Port (TAP) that implements a stateful protocol to access a set of test registers that present chip logic levels and device capabilities of various parts. During operation, the JTAG interface is used to read data from, and write data to, various components of the device, facilitating system testing, diagnosis, and fault isolation. In some cases, the device can be analyzed at the machine instruction level or in terms of a high-level code, providing external views into the internal configuration of the device with little to no prior knowledge of the design.

Figure 1:
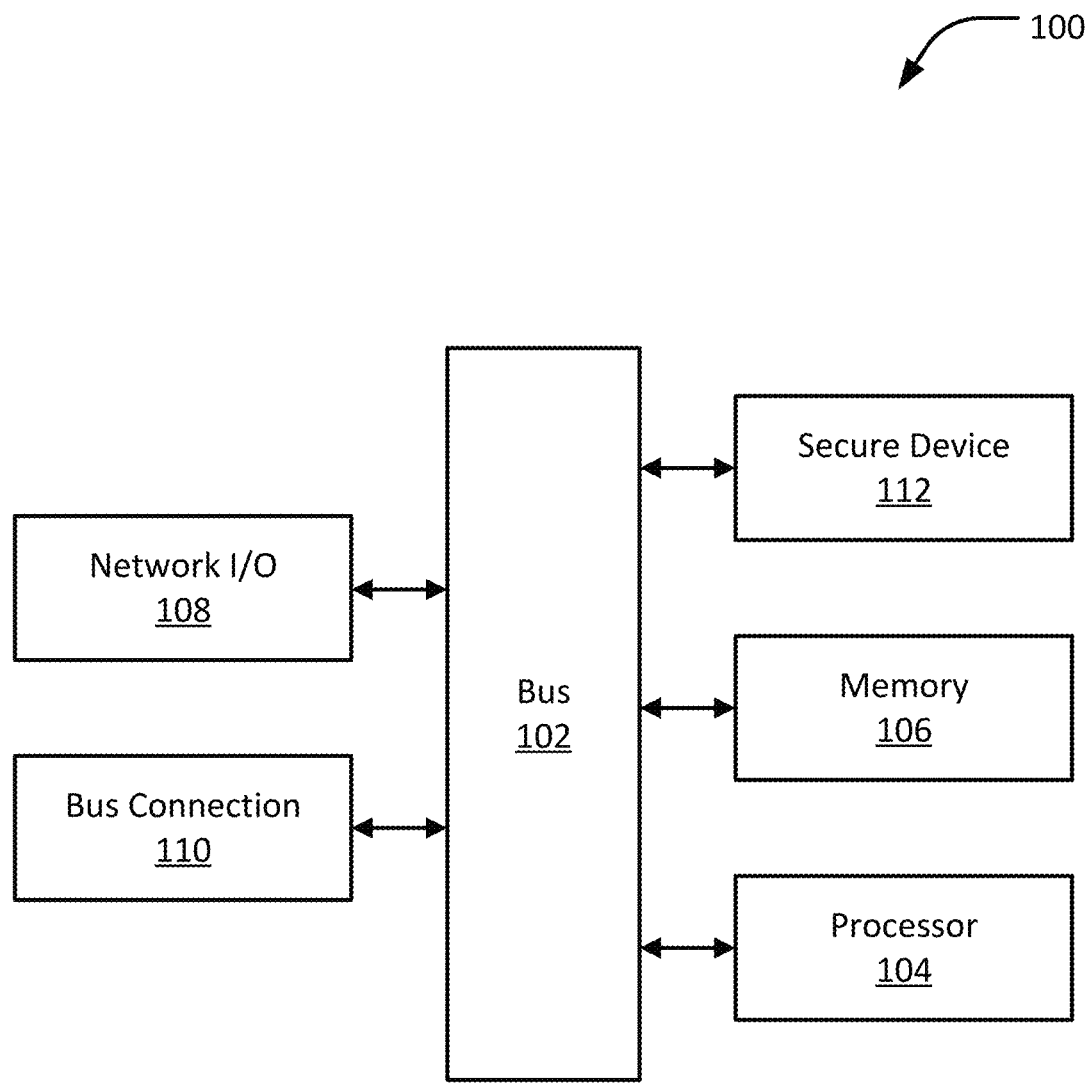
FIG. 1 is a block diagram of an example secure system, in accordance with an embodiment of the present disclosure.

Although the following detailed description will proceed with reference being made to illustrative embodiments, many alternatives, modifications, and variations thereof will be apparent in light of this disclosure.

DETAILED DESCRIPTION

In accordance with an embodiment of the present disclosure, a secure system is provided. The system includes a data port, a network on chip (NoC) module, a processor communicatively coupled to the NoC module, a communication interface operatively coupled to the processor and to the data port, an electronic field-programmable gate array (eFPGA) configuration module operatively coupled to the NoC module, and a clock operatively coupled to the NoC module. In a first modality, the communication interface is at least partially disabled. In a second modality, the communication interface is at least partially disabled, boundary scan operations are disabled, a RESET signal is held in a constant state, and/or redacted code is rendered inoperable. In a third modality, the communication interface is at least partially enabled to send and receive commands and data via the data port, the boundary scan operations are enabled, the RESET signal is not held in the constant state, and/or the redacted code is operable. As discussed in further detail below, numerous other embodiments and variations of the system will be apparent.

General Overview

System-on-Chip (SoC) devices can use one or more signal buses to route signals between various on-chip modules, components, and circuit blocks within a given chip. By nature of a typical application for such devices, the execution of on-chip commands between integral components of existing devices is relatively unsecure. For instance, existing devices may be used within a larger system that is deployed within a secure environment, thereby rendering intra-chip communication security measures unnecessary or of low value. However, there is increasing concern that a system-level integrated circuit chip or chip set can be compromised by bad actors, who are intent on accessing secure information, reverse engineering circuit designs, disrupting functionality, or otherwise gaining unauthorized access to the SoC devices, either during manufacturing or when the devices are obtained illicitly.

As noted above, one such way a SOC device can be accessed is via a JTAG communication channel. JTAG is designed to assist with device, board, and system testing, diagnosis, and fault isolation. For example, JTAG is used for accessing sub-blocks of integrated circuits (IC), making it a powerful mechanism for debugging embedded systems which might not have any other debug-capable communications channel. In some designs, JTAG-based debugging is available from the first instruction after CPU reset, which provides access to all instructions that are executed by the device. On-chip debug modules can be used to evaluate the device directly at the machine instruction level or in terms of high-level language source code. In particular, JTAG allows device programmer hardware to transfer data into internal non-volatile device memory (e.g. complex programmable logic devices, or CPLDs). Some device programmers serve a double purpose for programming as well as debugging the device. In the case of FPGAs, volatile memory devices can also be programmed via the JTAG port. In addition, internal monitoring capabilities (temperature, voltage and current) may be accessible via the JTAG port.

In view of the above, it will be appreciated that DFT solutions that utilize JTAG are powerful and useful for validating semiconductors at the foundry. However, increasingly complex ICs that provide support for multiple capabilities and mixed technologies have increased the cost of owning foundries having the capability to produce such devices, including at or below the 7 nanometer (7 nm) size. In turn, the number of foundries capable of producing complex devices has decreased to just a few.

Consequently, only a small number of high-end commercial foundries now manufacture high-performance, mixed system ICs for multiple customers worldwide, and as a result they are typically untrusted and uncontrolled by any individual design house. If the foundry is untrusted, security vulnerabilities may be present into the fabrication process. For example, if a design is fabricated in an untrusted foundry that is not controlled by the customer, the foundry can potentially use the JTAG capabilities of the device for reverse engineering, circuit modification, and intellectual property (IP) theft. In some cases, the untrusted foundry may overbuild the ICs and provide the excess devices to an adversary or competitor without the knowledge or approval of the customer or in violation of the International Traffic in Arms Regulations (ITAR) or other regulations. The adversary or competitor may then use the devices for purposes that create security or financial risks to enterprises or states. For at least these reasons, there is increasing concern that existing designs are insufficient to prevent or otherwise mitigate unauthorized uses or forensic examinations of such devices.

As an extension of DFT, several secure solutions have been developed to help mitigate against reverse engineering, circuit modification, and IP theft of semiconductor devices. Examples of secure solutions include logic encryption, camouflaging of gate layouts, password protection, and the use of dummy CPLD code to prevent the foundry from accessing certain aspects of the design. However, these solutions may prevent the foundry from performing manufacturing validation, in which case all produced chips are sent to the customer for in-house validation. Also, existing secure safeguards can still be compromised in various ways by malicious actors without the knowledge of the customer.

To this end, and in accordance with an example of the present disclosure, a secure architecture is disclosed. The secure architecture protects the semiconductor device design during manufacturing and protects the semiconductor device from side channel attacks during operation. For example, embodiments of the present disclosure provide secure blocks that can protect the design from unauthorized use, reverse engineering, and over production (e.g., illicitly produced wafers). Some example embodiments protect the secure device from side channel attacks via JTAG, re-clocking, Trojan attacks on data storage components, and limits on FPGA configuration access and modification. Some other example embodiments protect the secure device from over production by disabling boundary scan operations and/or by asserting RESET signals to prevent chip operation. Numerous other embodiments and variations will be appreciated in light of this disclosure.

Secure System

FIG. 1 is a block diagram of an example secure system 100, in accordance with an example of the present disclosure. The system 100 can represent various circuit blocks or modules within a SoC and/or a multichip package. Accordingly, the various circuit blocks described herein may be implemented using an integrated circuit fabricated on a single chip, across multiple chips within a same chip package, or across chips in different chip packages.

The system includes a signal bus 102 that is configured to route signals between various circuit blocks or other components of the system 100, including at least one secure device 112. Various other circuit blocks or components may be coupled to one or more ports of the signal bus 102, such as a processor 104, a memory 106, or a network I/O circuit 108. Any other circuits or other signal buses may be coupled to the signal bus 102 via a bus connection 110 or other suitable interface. In this manner, the secure device 112 can be accessed by one or more other components of the system 100 via the signal bus 102.

As will be described in further detail below, the secure device 112 can be any semiconductor or other SoC device that is designed to mitigate against, for example, reverse engineering, circuit modification, and IP theft of semiconductor devices, or otherwise incorporates other secure attributes, techniques, or features.

Other componentry and functionality not reflected in FIG. 1 will be apparent in light of this disclosure, and it will be appreciated that other embodiments are not limited to any particular hardware configuration. For example, the processor 104 can be any suitable processor and may include one or more coprocessors or controllers. In some examples, the processor 104 can be implemented as any number of processor cores. The processor 104 (or processor cores) can be any type of processor, such as, for example, a microprocessor, an embedded processor, a digital signal processor (DSP), a graphics processor (GPU), a network processor, a field programmable gate array or other device configured to execute code. The processor 104 can include multithreaded cores in that they may include more than one hardware thread context (or "logical processor") per core. The processor 104 can be implemented as a complex instruction set computer (CISC) or a reduced instruction set computer (RISC) processor. In some examples, the processor 104 can include, for example, a micro-processor, an embedded processor, a digital signal processor (DSP), a graphics processor (GPU), a network processor, a field programmable gate array (FPGA), application-specific integrated circuit (ASIC) or other device configured to execute code. The processor 104 can be configured to execute an operating system (OS), such as Google Android (by Google Inc. of Mountain View, Calif.), Microsoft Windows (by Microsoft Corp. of Redmond, Wash.), Apple OS X (by Apple Inc. of Cupertino, Calif.), Linux, or a real-time operating system (RTOS). As will be appreciated in light of this disclosure, the techniques provided herein can be implemented without regard to the particular operating system provided in conjunction with the system 100, and therefore may also be implemented using any suitable existing systems or platforms.

The memory 106 can be implemented using any suitable type of digital storage including, for example, flash memory and/or random-access memory (RAM). In some examples, the memory 106 includes various layers of standard memory hierarchy and/or standard memory caches. The memory 106 can be implemented as a volatile memory device such as, but not limited to, a RAM, dynamic RAM (DRAM), or static RAM (SRAM) device.

The network I/O 108 represents any suitable type of wired and/or wireless network interface designed to receive and transmit signals across a network. Wired communication may conform to existing standards, such as, for example, Ethernet. Wireless communication may conform to existing standards, such as, for example, cellular communications including LTE (Long Term Evolution), Wireless Fidelity (Wi-Fi), Bluetooth, and/or Near Field Communication (NFC). Examples of such wireless networks include, but are not limited to, wireless local area networks, wireless personal area networks, wireless metropolitan area networks, cellular networks, and satellite networks.

According to at least some examples, the processor 104, the memory 106, the network I/O 108, the secure device 112, and any other devices coupled to the bus 102 may be designated as being unsecure sources. An unsecure source or device may be any circuit or device that has the possibility of being compromised in some way (e.g., unauthorized use or examination), and thus cannot be fully trusted.

It will be appreciated that in some examples, some of the various components of the system 100 can be combined or integrated in a SoC architecture. In some examples, the components may be hardware components, firmware components, software components or any suitable combination of hardware, firmware or software.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

Secure Device

Figure 2:
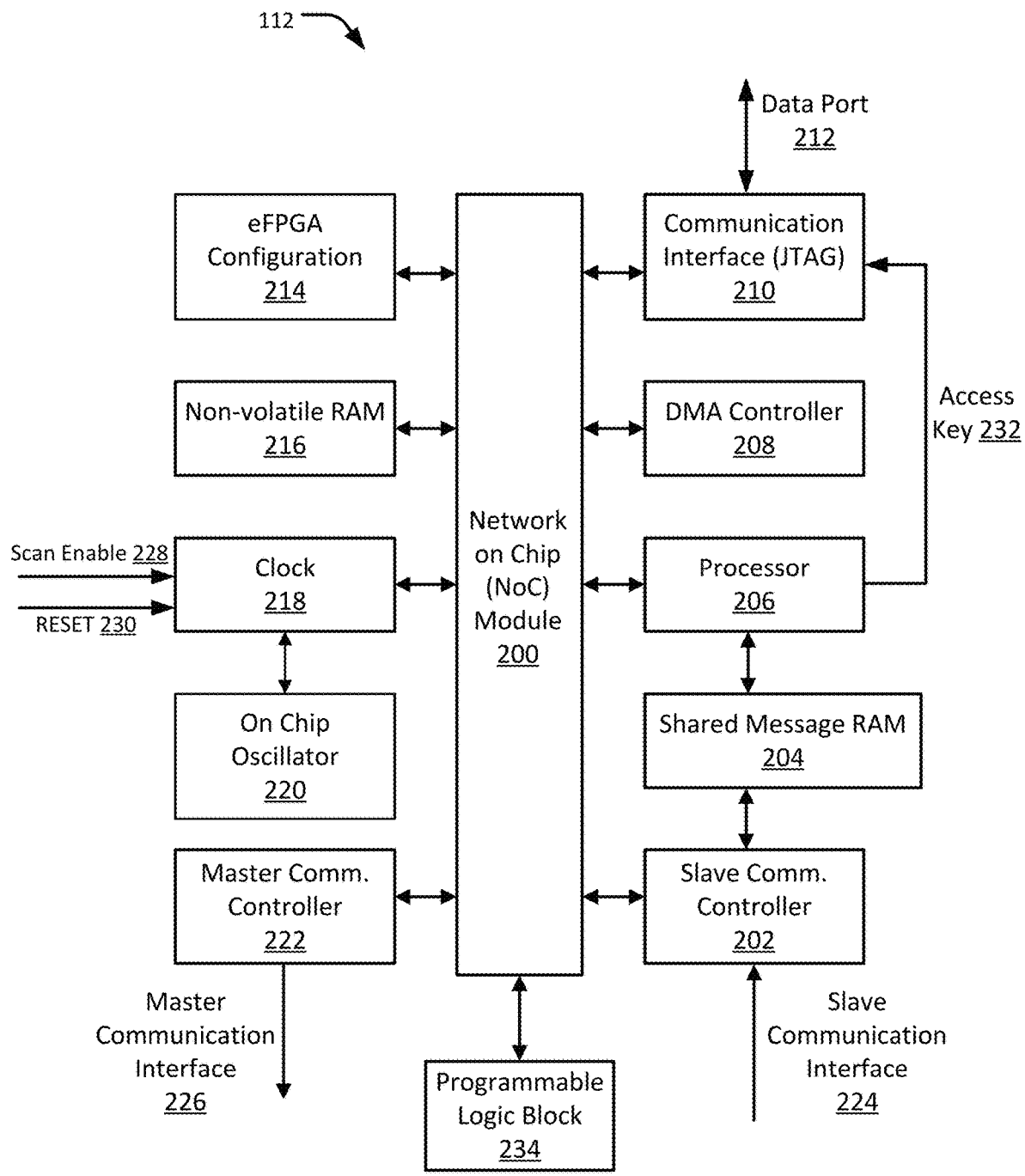
FIG. 2 is a block diagram of a secure device of the system of FIG. 1, in accordance with an embodiment of the present disclosure.

FIG. 2 is a block diagram of the secure device 112 of FIG. 1, in accordance with an example of the present disclosure. The secure device 112 can be implemented, for example, as an FPGA. The secure device 112 includes a network on chip (NoC) module 200, a slave communication controller 202, a shared message random access memory 204, a processor 206, a direct memory access (DMA) controller 208, a communications interface 210, a data port 212, an electronic FPGA (eFPGA) configuration module 214, a non-volatile RAM (NVRAM) 216, a clock 218, an on-chip oscillator 220, and a slave communication controller 202. The device 112 can include one or more programmable logic blocks 234, or test cells, that can be used in conjunction with debugging or boundary scan operations to test or otherwise exercise the operation of the device 112. Each of the programmable logic blocks 234 is accessible via the NoC module 200.

The slave communication controller 202 is operatively coupled to a slave communication interface 224, the NoC module 200, and the shared message RAM 204. The processor 206 is operatively coupled to the NoC module 200 and the shared message RAM 204. The DMA controller 208 is operatively coupled to the NoC module 200. The communication interface 210 is operatively coupled to the NoC module 200 and the data port 212. In some examples, the communication interface 210 includes a JTAG interface. The eFPGA configuration module 214 is operatively coupled to the NoC module 200. The NVRAM 216 is operatively coupled to the NoC module 200. The clock 218 is operatively coupled to the NoC module 200 and the on-chip oscillator 220. The clock 218 is configured to receive a scan enable signal 228 and a RESET signal 230. The master communication controller 222 is operatively coupled to the NoC module 200 and a master communication interface 226.

The NoC module 200 is configured to provide data and signal communications between various components of the device 112, such as communications between the processor 206, the communication interface 210 via the data port 212, the eFPGA configuration module 214, the NVRAM 216, and the clock 218. In this manner, the NoC module 200 can provide access to various components of the device 112 form the data port 212 via the communication interface 210. For example, a user can use the data port 212 to read data from, or write data to, the NVRAM 216; to access debug functionality of the device 112; to modify a FPGA configuration in the eFPGA configuration module 214; and to modify the clock 218. However, as noted above, when the device 112 is under the control of an untrusted foundry or other entity, a user can potentially obtain information about the logic design of the device 112 via the data port 212 (e.g., using a boundary scan function) or to otherwise alter the functionality of the device (e.g., by re-clocking the device 112, which can cause the device 112 to enter an unprotected state). To this end, the device 112 includes various design aspects and elements that can be used to prevent unauthorized use or examination, such as described below.

Secure Communication Interface

In accordance with an example of the present disclosure, the communication interface 210 (e.g., a JTAG interface) is configured to reject some or all commands received from the data port 212 or the slave communication interface 224 unless a valid access key 232 is present, depending on the security level of the communication interface 210 (e.g., partially open or completely open). In some examples, the processor 206 is configured to generate the access key 232. The access key 232 can be any data, such as a series of digits, characters, or values. For example, the processor 206 can generate the access key 232 based on a value set by an electronic fuse, or eFuse, configured to change a circuit on the secure device 112 during operation. In another example, the processor 206 can generate the access key 232 based on a random number generator located outside of the secure device 112 (such as another component of a system of which the secure device 112 is connected to). Other techniques for generating the access key 232 will be apparent in light of this disclosure, including hardware, firmware, and software-based techniques. The access key 232 can be static or variable based on an algorithm programmed into the processor 206. In some examples, the access code includes a challenge code and a response code. Both of these are signaled to the communication interface 210 (e.g., a JTAG controller) from the processor 206 via dedicated signals. A user can enter a JTAG command via the communication interface 210 to retrieve the challenge code. The user can then supply a response code back via another JTAG command. If the user provided response code matches the response code from the processor 206, then the communication interface 210 is unlocked to permit further access. In some examples, the challenge code and the response code are configurable by the user.

The communication interface 210 is configured to enable communication access to and from the NoC module 200 (and all other components of the device 112) via the data port 212 in response to a presence of the valid access key 232. The communication interface 210 is further configured to disable the communication access to and from the NoC module 200 via the data port 212 in response to an absence of the valid access key 232, or in the presence of an invalid access key. In some examples, the communication interface 212 can have multiple modes, where each of the modes provides different levels of access to the device 112. In this manner, the communication interface 210 is partially or completely disabled when the access key 232 is not present and enabled when the access key 232 is present.

FPGA Configuration Control

In accordance with an example of the present disclosure, the logic of the device 112 (e.g., code to be executed by the device 112) is redacted such that the device 112 cannot operate unless the eFPGA configuration module 214 is loaded with the proper configuration for operation. In some examples, the eFPGA configuration module 214 is loaded at boot up or start time with a configuration stored in the NVRAM 216 or in other locations within the device 112. In some examples, the NVRAM 216 is isolated to a protected area of the device 112 such that the NVRAM 216 cannot be accessed via the data port 212 or the slave communication interface 224 unless authorized by the processor 206. Further, the NVRAM 216 can be configured to store executable instructions and data to be used by the processor 206, thereby protecting the processor 206 from unauthorized external control.

Boundary Scan and Clock Control

In accordance with an example of the present disclosure, the device 112 includes the programmable logic block 234 (or test cell), which is configured to operate in a boundary scan mode (also referred to as a scan mode). The NVRAM 216 is configured to store field-programmable gate array (FPGA) configuration data that can be loaded into the eFPGA configuration module 214. The clock 218 is configured to enable the scan mode of the programmable logic block and/or to de-assert a reset signal to the programmable logic block in response to a presence of the FPGA configuration in the eFPGA configuration module 214. The clock 218 is further configured to disable the scan mode of the programmable logic block and/or to assert the reset signal to the programmable logic block in response to an absence of the FPGA configuration data in the eFPGA configuration module 214. In some examples, the clock 218 is controlled by the on-chip oscillator 220, which is configured to internally generate a clock signal for operation of the device 112.

In some examples, the device 112 is configured such that when the eFPGA configuration module 214 has no loaded configuration, or is loaded with an improper configuration, the boundary scan function is disabled (e.g., the scan enable signal 228 is ignored or bypassed to prevent scan strings from being executed) and/or the RESET signal 230 is held in a constant state to prevent reset and operation of the device 112 (e.g., the clock 212 is disabled).

In some examples, the slave communication controller 202 is configured to receive a data access command via the slave communication interface 224. For example, the command can include a request to access data stored in the NVRAM 216. In such examples, the command is passed to the processor 206 via the shared message RAM module 204. The processor 206 retrieves the command from the shared message RAM 204 module 204. The processor 206 is configured to determine whether the command is valid (e.g., has access rights to the NVRAM 216), and if valid, to send the data stored in the NVRAM 216 to the master communication controller 222 for output via the master communication interface 226.

External Command Control

In accordance with an example of the present disclosure, the processor 206 is configured to receive one or more commands from the shared message RAM 204. The commands can include, for example, a request to output data from any portion of the device 112 to the master communication interface 226 via the master communication controller 222. The commands can be loaded from the slave communication interface 224 into the shared message RAM 204 via the slave communication controller 202. The processor 206 is further configured to determine whether the one or more commands are authorized to be executed. If the processor 206 determines that the one or more commands are authorized, the results of the commands (e.g., data) are output to the master communication interface 226 via the master communication controller 222. Otherwise, the commands are not executed.

Secure Device Modalities

Figure 3:
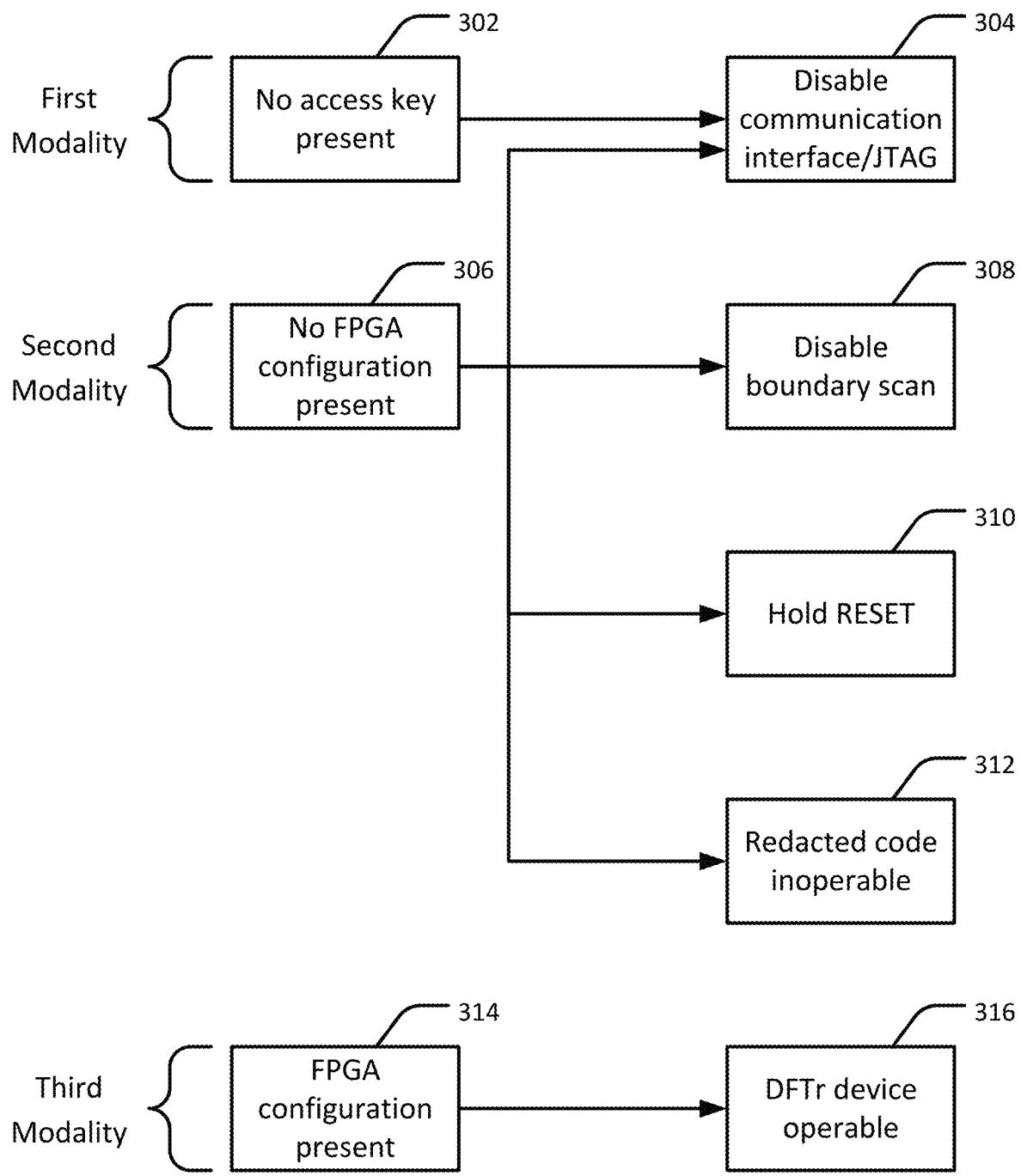
FIG. 3 is a block diagram representing several modalities of the secure device of FIGS. 1 and 2, in accordance with an embodiment of the present disclosure.

FIG. 3 is a block diagram representing several modalities of the secure device 112 of FIGS. 1 and 2, in accordance with an example of the present disclosure. In a first modality 302, where no access key is present, the communication interface 210 is at least partially disabled 304. In the first modality 302, for example, JTAG commands are prevented from execution within the device 112 as a result of disabling the communication interface 210, which helps to secure the device 112 from unauthorized use and examination via the data port 212.

In a second modality 306, where no FPGA configuration is present in the eFPGA configuration module 214, one or more of the following can occur: the communication interface 210 is at least partially disabled 304; boundary scan operations are disabled 308; the RESET signal 310 is held in a constant state (high or low), and/or redacted code in the device 112 is rendered inoperable 312. In some examples, the clock 218 is configured to ignore or bypass the scan enable signal 228 to prevent scan strings from being executed (disable boundary scan 308). In some other examples, the clock 218 is configured to hold the RESET signal 310 in a constant state such that the processor 206 cannot execute commands (such as by disabling clocking of the processor 206). In some other examples, the device 112 includes redacted code that is inoperable unless a suitable FPGA configuration is present to supplement the redacted code in the device 112. In this manner, the device 112 can be configured, in the second modality 306, to perform only those functions for which the code is not redacted when the FPGA configuration is present.

In a third modality 314, the device 112 can be configured to be operable 316 when the FPGA configuration is present. For example, in the third modality 314, the communication interface 210 is at least partially enabled to send and receive commands and data via the data port 212; boundary scans are enabled; and/or the RESET signal 310 is not held in a constant state, which allows the processor 206 to execute instructions. Other variations of these modalities will be apparent in view of this disclosure.

Process Flows

Figure 4:
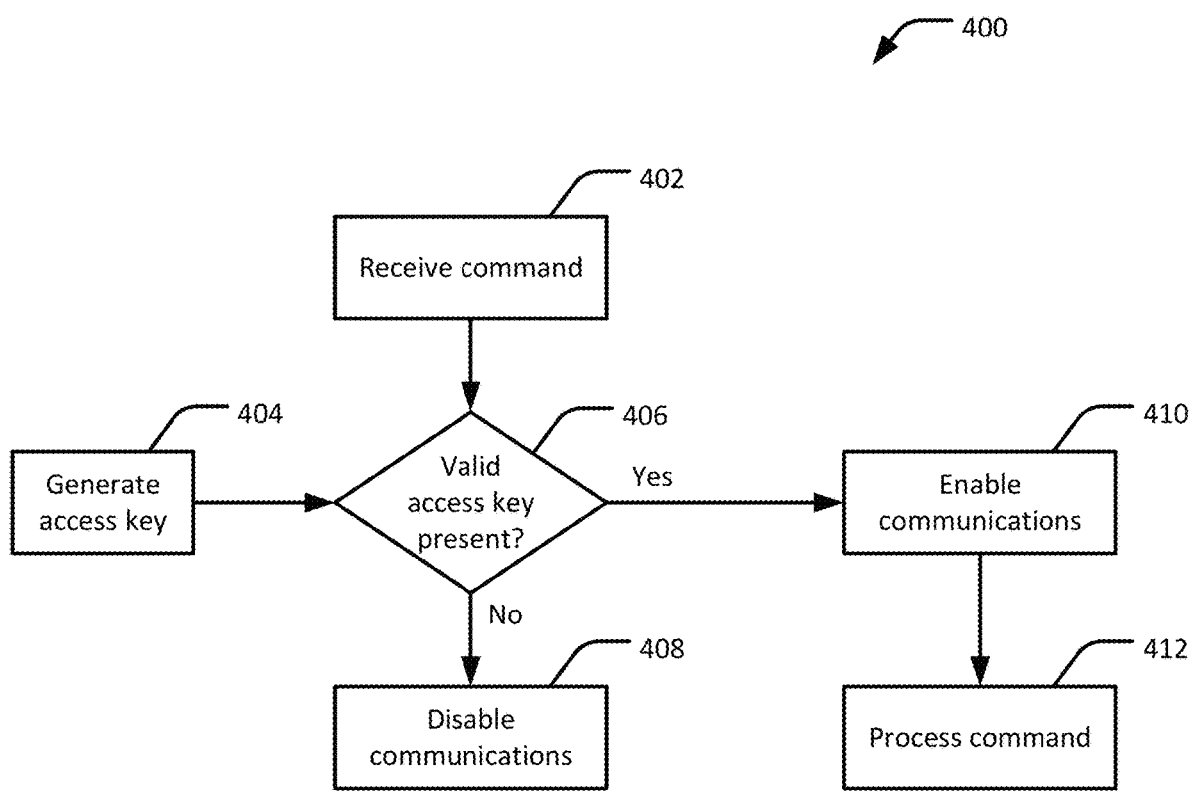
FIG. 4 is a flow diagram of an example process for enabling and disabling the communication interface of the device of FIG. 2, in accordance with an embodiment of the present disclosure.

FIG. 4 is a flow diagram of an example process 400 for enabling and disabling the communication interface 210 of the device 112 of FIG. 2, in accordance with an example of the present disclosure. The process 400 includes receiving a command 402 via the communication interface 210 (e.g., the data port 212). The process 400 further includes generating 404 an access key (e.g., by the processor 206). The access key can, for example, be a static or variable value. If a valid access key is present 406, then the process 400 includes enabling 410 the communication interface 210 so that the command can be passed to other components of the device 112 (e.g., the processor 206) to be processed 412. If a valid access key is not present 406, then the process 400 includes at least partially or fully disabling 408 the communication interface 210. The access key can be any data, such as a series of digits, characters, or values.

Figure 5:
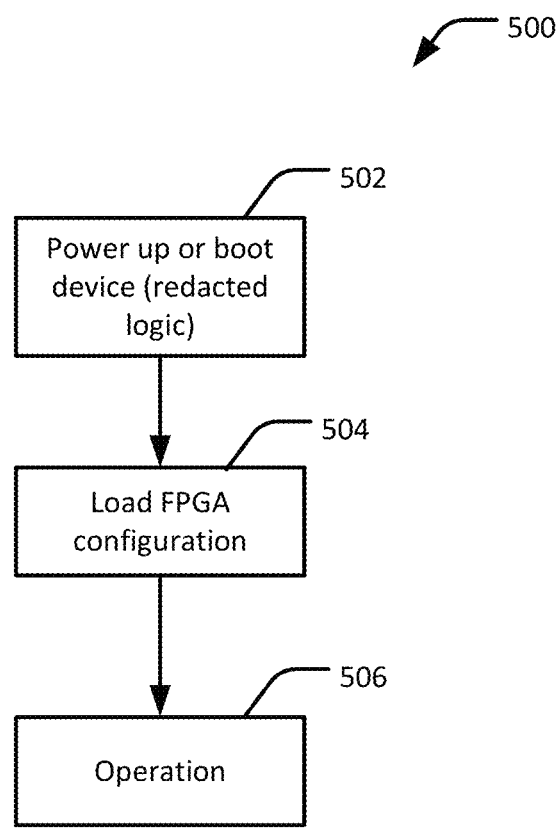
FIG. 5 is a flow diagram of an example process for operating the device of FIG. 2, in accordance with an embodiment of the present disclosure.

FIG. 5 is a flow diagram of an example process 500 for operating the device 112 of FIG. 2, in accordance with an example of the present disclosure. The process 500 includes powering up or booting 502 the device and loading 504 an FPGA configuration into a memory of the device 112 (e.g., loading an FPGA configuration into the eFPGA configuration module 214 form the NVRAM 216 or from another memory). For example, the logic of the device 112 (e.g., code to be executed by the device 112) is redacted such that the device 112 cannot operate unless the eFPGA configuration module 214 is loaded with the proper configuration for operation 506. In some examples, the NVRAM 216 is isolated to a protected area of the device 112 such that the NVRAM 216 cannot be accessed via the data port 212 or the slave communication interface 224 unless authorized by the processor 206.

Figure 6:
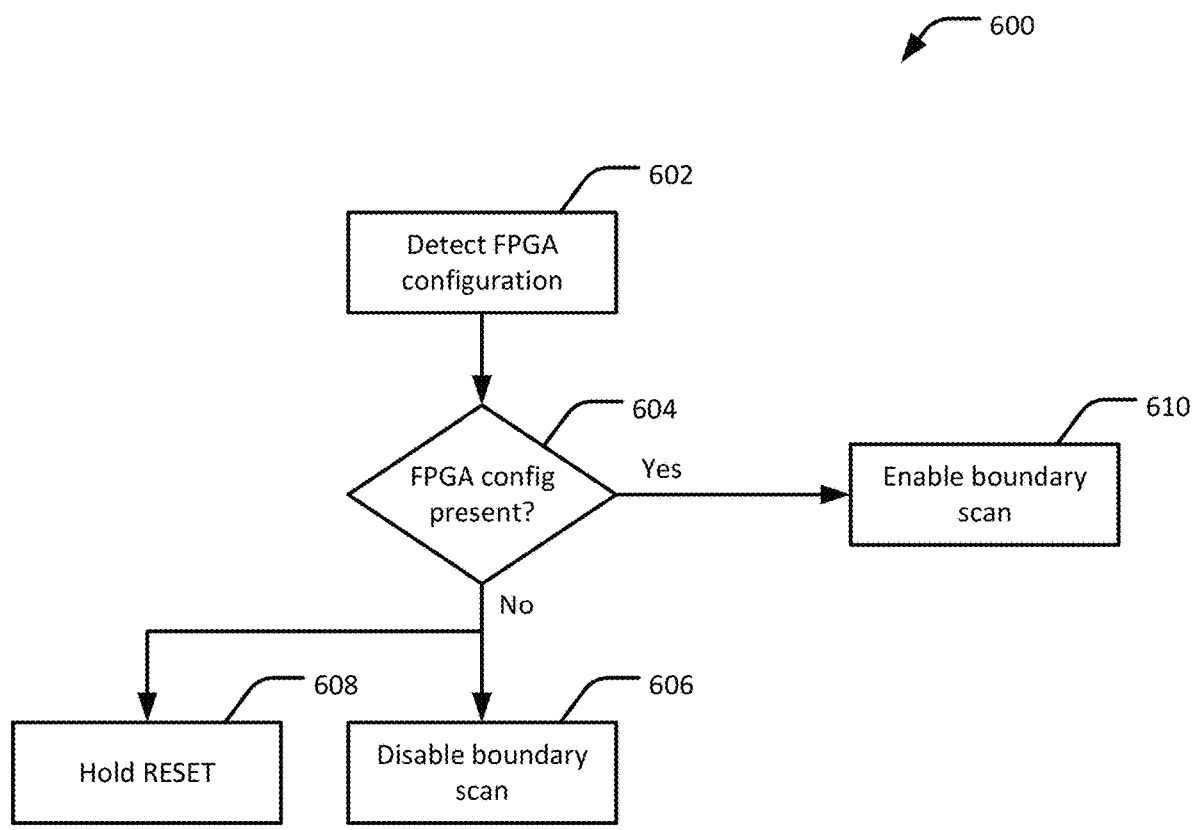
FIG. 6 is a flow diagram of an example process for boundary scan and clock control of the device of FIG. 2, in accordance with an example of the present disclosure.

FIG. 6 is a flow diagram of an example process 600 for boundary scan and clock control of the device 112 of FIG. 2, in accordance with an example of the present disclosure. The process 600 includes detecting 602 an FPGA configuration loaded in the eFPGA configuration module 214. If the eFPGA configuration module 214 has no loaded configuration 604, or is loaded with an improper configuration, the process 600 includes disabling 606 the boundary scan function and/or holding 608 the RESET signal in a constant state to prevent reset and operation of the device 112 (e.g., the clock 212 is disabled). Otherwise, the process 600 includes enabling 610 the boundary scan function of the device 112.

FURTHER EXAMPLE EMBODIMENTS

The following examples pertain to further embodiments, from which numerous permutations and configurations will be apparent.

Example 1 provides a secure semiconductor device, including a data port; a network on chip (NoC) module; a processor communicatively coupled to the NoC module, the processor configured to generate an access key; and a communication interface operatively coupled to the processor and to the data port, the communication interface configured to enable communication access to and from the NoC module via the data port in response to a presence of the access key, and disable the communication access to and from the NoC module via the data port in response to an absence of the access key.

Example 2 includes the subject matter of Example 1, further including an electronic field-programmable gate array (eFPGA) configuration module; and a clock configured to assert a RESET signal in response to an absence of FPGA configuration data stored in the eFPGA configuration module, thereby disabling operation of the device.

Example 3 includes the subject matter of any one of Examples 1 and 2, further including an electronic field-programmable gate array (eFPGA) configuration module; a programmable logic block configured to operate in a boundary scan mode; and a clock configured to disable the boundary scan mode of the programmable logic block in response to an absence of FPGA configuration data stored in the eFPGA configuration module.

Example 4 includes the subject matter of any one of Examples 1-3, further including a programmable logic block configured to operate in a boundary scan mode; an electronic field-programmable gate array (eFPGA) configuration module; a non-volatile random-access memory (NVRAM) configured to store field-programmable gate array (FPGA) configuration data; and a clock configured to enable the boundary scan mode of the programmable logic block and/or to de-assert a reset signal to the programmable logic block in response to a presence of the FPGA configuration in the eFPGA configuration module, and disable the boundary scan mode of the programmable logic block and/or to assert the reset signal to the programmable logic block in response to an absence of the FPGA configuration data in the eFPGA configuration module.

Example 5 includes the subject matter of any one of Examples 1-4, wherein the communication interface includes a JTAG interface.

Example 6 includes the subject matter of any one of Examples 1-5, further including an on-chip oscillator operatively coupled to the processor.

Example 7 provides a secure semiconductor device, including a network on chip (NoC) module; an electronic field-programmable gate array (eFPGA) configuration module; and a clock operatively coupled to the eFPGA configuration module via the NoC module, the clock configured to assert a RESET signal in response to an absence of FPGA configuration data stored in the eFPGA configuration module, thereby disabling operation of the device.

Example 8 includes the subject matter of Example 7, further including a data port; a processor communicatively coupled to the NoC module, the processor configured to generate an access key; and a communication interface operatively coupled to the processor and to the data port, the communication interface configured to enable communication access to and from the NoC module via the data port in response to a presence of the access key, and disable the communication access to and from the NoC module via the data port in response to an absence of the access key.

Example 9 includes the subject matter of any one of Examples 7 and 8, wherein the communication interface includes a JTAG interface.

Example 10 includes the subject matter of any one of Examples 7-9, further including a programmable logic block configured to operate in a boundary scan mode, wherein the clock is configured to disable the boundary scan mode of the programmable logic block in response to an absence of FPGA configuration data stored in the eFPGA configuration module.

Example 11 includes the subject matter of any one of Examples 7-10, further including a programmable logic block configured to operate in a boundary scan mode; and a non-volatile random-access memory (NVRAM) configured to store field-programmable gate array (FPGA) configuration data, wherein the clock is configured to enable the boundary scan mode of the programmable logic block and/or to de-assert a reset signal to the programmable logic block in response to a presence of the FPGA configuration in the eFPGA configuration module, and disable the boundary scan mode of the programmable logic block and/or to assert the reset signal to the programmable logic block in response to an absence of the FPGA configuration data in the eFPGA configuration module.

Example 12 includes the subject matter of any one of Examples 7-11, further including an on-chip oscillator operatively coupled to the clock.

Example 13 provides a secure system, including a data port; a network on chip (NoC) module; a processor communicatively coupled to the NoC module; a communication interface operatively coupled to the processor and to the data port; an electronic field-programmable gate array (eFPGA) configuration module operatively coupled to the NoC module; and a clock operatively coupled to the NoC module, wherein in a first modality, the communication interface is at least partially disabled, wherein in a second modality, the communication interface is at least partially disabled, boundary scan operations are disabled, a RESET signal is held in a constant state, and/or redacted code is rendered inoperable, and wherein in a third modality, the communication interface is at least partially enabled to send and receive commands and data via the data port, the boundary scan operations are enabled, the RESET signal is not held in the constant state, and/or the redacted code is operable.

Example 14 includes the subject matter of Example 13, further including an on-chip oscillator operatively coupled to the clock.

Example 15 includes the subject matter of any one of Examples 13 and 14, wherein the communication interface includes a JTAG interface.

Example 16 includes the subject matter of any one of Examples 13-15, wherein in the first modality or the second modality, the communication interface is configured to enable communication access to and from the NoC module via the data port in response to a presence of the access key, and disable the communication access to and from the NoC module via the data port in response to an absence of the access key.

Example 17 includes the subject matter of any one of Examples 13-16, wherein in the second modality, the clock is configured to assert a RESET signal in response to an absence of FPGA configuration data stored in the eFPGA configuration module.

Example 18 includes the subject matter of any one of Examples 13-17, wherein in the second modality, the clock is configured to disable the boundary scan mode of the programmable logic block in response to an absence of FPGA configuration data stored in the eFPGA configuration module.

Example 19 includes the subject matter of any one of Examples 13-18, further including a programmable logic block configured to operate in a boundary scan mode; and a non-volatile random-access memory (NVRAM) configured to store field-programmable gate array (FPGA) configuration data, wherein, in the second modality, the clock is configured to disable the boundary scan mode of the programmable logic block and/or to assert the reset signal to the programmable logic block in response to an absence of the FPGA configuration data in the eFPGA configuration module.

Example 20 includes the subject matter of any one of Examples 13-19, further including wherein, in the second modality, the clock is further configured to enable the boundary scan mode of the programmable logic block and/or to de-assert a reset signal to the programmable logic block in response to a presence of the FPGA configuration in the eFPGA configuration module.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A secure semiconductor device, comprising:
a data port;
a network on chip (NoC) module;
a processor communicatively coupled to the NoC module, the processor configured to generate an access key;
a communication interface operatively coupled to the processor and to the data port, the communication interface configured to
enable communication access to and from the NoC module via the data port in response to a presence of the access key, and
disable the communication access to and from the NoC module via the data port in response to an absence of the access key; and
an electronic field-programmable gate array (eFPGA) configuration module;
a programmable logic block configured to operate in a boundary scan mode; and
a clock configured to disable the boundary scan mode of the programmable logic block in response to an absence of FPGA configuration data stored in the eFPGA configuration module.

2. The device of claim 1, further comprising:
an electronic field-programmable gate array (eFPGA) configuration module; and
a clock configured to assert a RESET signal in response to an absence of FPGA configuration data stored in the eFPGA configuration module, thereby disabling operation of the device.

3. The device of claim 1, further comprising:
a programmable logic block configured to operate in a boundary scan mode;
an electronic field-programmable gate array (eFPGA) configuration module;
a non-volatile random-access memory (NVRAM) configured to store field-programmable gate array (FPGA) configuration data; and
a clock configured to
enable the boundary scan mode of the programmable logic block and/or to de-assert a reset signal to the programmable logic block in response to a presence of the FPGA configuration in the eFPGA configuration module, and
disable the boundary scan mode of the programmable logic block and/or to assert the reset signal to the programmable logic block in response to an absence of the FPGA configuration data in the eFPGA configuration module.

4. The device of claim 1, wherein the communication interface includes a JTAG interface.

5. The device of claim 1, further comprising an on-chip oscillator operatively coupled to the processor.

6. A secure semiconductor device, comprising:
a network on chip (NoC) module;
an electronic field-programmable gate array (eFPGA) configuration module;
a clock operatively coupled to the eFPGA configuration module via the NoC module, the clock configured to assert a RESET signal in response to an absence of FPGA configuration data stored in the eFPGA configuration module, thereby disabling operation of the device; and
a programmable logic block configured to operate in a boundary scan mode;
wherein the clock is configured to disable the boundary scan mode of the programmable logic block in response to an absence of FPGA configuration data stored in the eFPGA configuration module.

7. The device of claim 6, further comprising:
a data port;
a processor communicatively coupled to the NoC module, the processor configured to generate an access key; and
a communication interface operatively coupled to the processor and to the data port, the communication interface configured to
   enable communication access to and from the NoC module via the data port in response to a presence of the access key, and
   disable the communication access to and from the NoC module via the data port in response to an absence of the access key.

8. The device of claim 7, wherein the communication interface includes a JTAG interface.

9. The device of claim 6, further comprising:
a programmable logic block configured to operate in a boundary scan mode; and
a non-volatile random-access memory (NVRAM) configured to store field-programmable gate array (FPGA) configuration data;
wherein the clock is configured to
   enable the boundary scan mode of the programmable logic block and/or to de-assert a reset signal to the programmable logic block in response to a presence of the FPGA configuration in the eFPGA configuration module, and
   disable the boundary scan mode of the programmable logic block and/or to assert the reset signal to the programmable logic block in response to an absence of the FPGA configuration data in the eFPGA configuration module.

10. The device of claim 6, further comprising an on-chip oscillator operatively coupled to the clock.

11. A secure system, comprising:
a data port;
a network on chip (NoC) module;
a processor communicatively coupled to the NoC module;
a communication interface operatively coupled to the processor and to the data port;
an electronic field-programmable gate array (eFPGA) configuration module operatively coupled to the NoC module; and
a clock operatively coupled to the NoC module;
wherein in a first modality, the communication interface is at least partially disabled;
wherein in a second modality, the communication interface is at least partially disabled, boundary scan operations are disabled, a RESET signal is held in a constant state, and/or redacted code is rendered inoperable;
wherein in a third modality, the communication interface is at least partially enabled to send and receive commands and data via the data port, the boundary scan operations are enabled, the RESET signal is not held in the constant state, and/or the redacted code is operable; and
wherein, in the second modality, the clock is configured to disable the boundary scan mode of the programmable logic block in response to an absence of FPGA configuration data stored in the eFPGA configuration module.

12. The system of claim 11, further comprising an on-chip oscillator operatively coupled to the clock.

13. The system of claim 11, wherein the communication interface includes a JTAG interface.

14. The system of claim 11, wherein in the first modality or the second modality, the communication interface is configured to:
enable communication access to and from the NoC module via the data port in response to a presence of an access key; and
disable the communication access to and from the NoC module via the data port in response to an absence of the access key.

15. The system of claim 11, wherein, in the second modality, the clock is configured to assert a RESET signal in response to an absence of FPGA configuration data stored in the eFPGA configuration module.

16. The system of claim 11, further comprising:
a programmable logic block configured to operate in a boundary scan mode; and
a non-volatile random-access memory (NVRAM) configured to store field-programmable gate array (FPGA) configuration data;
wherein, in the second modality, the clock is configured to disable the boundary scan mode of the programmable logic block and/or to assert the reset signal to the programmable logic block in response to an absence of the FPGA configuration data in the eFPGA configuration module.

17. The system of claim 16, wherein, in the second modality, the clock is further configured to enable the boundary scan mode of the programmable logic block and/or to de-assert a reset signal to the programmable logic block in response to a presence of the FPGA configuration in the eFPGA configuration module.

* * * * *